Patented Feb. 13, 1951

2,541,747

UNITED STATES PATENT OFFICE 2,541,747

PRODUCTION OF HYDROXYL COMPOUNDS BY HYDROLYSIS OF TETRAHYDROPYRYL ETHERS

Harry B. Copelin, Niagara Falls, N. Y., assignor to E. I. du Pont de Nemours & Company, Wilmington, Del., a corporation of Delaware No Drawing. Application May 21, 1949, Serial No. 94,739

10 Claims. (Cl. 260—333)

This invention relates to the production of hydroxyl compounds and more particularly to a novel process for the production of hydroxyl compounds.

It is known that useful and valuable compounds may be prepared from various hydroxyl-containing compounds such as alcohols and phenols by the substitution of various groups or radicals in the molecule. It is necessary, however, to protect the hydroxyl group and this has been accomplished by various methods including acetylation. A more recent and very useful method consists in reacting the hydroxyl group of the starting compound with dihydropyran as described by Parham and Anderson, J. A. C. S., vol. 70, page 4187, December 1948. As shown by these authors the method is applicable to a wide variety of hydroxyl-containing compounds.

According to prior art methods the tetrahydropyryl ethers obtained by the reaction of dihydropyran with aliphatic or aromatic hydroxyl compounds are reacted with other compounds to introduce the desired substituents and the ether compound is then hydrolyzed. This method although satisfactory for producing small amounts of substituted hydroxyl compounds has the disadvantage that during hydrolysis the tetrahydropyryl group is converted to hydroxyvaleraldehyde which is usually resinified under the conditions of hydrolysis; thus the dihydropyran utilized to protect the hydroxy group is not available for further use.

It is an object of this invention to provide an improved process for the production of hydroxyl compounds.

Another object is to provide a practical process for the production of substituted hydroxyl compounds wherein the dihydropyran utilized to protect the hydroxyl group is recovered in high yields.

A further object is to provide a novel and useful process for the conversion of tetrahydropyryl ethers to dihydropyran and a hydroxyl compound.

These and other objects will be apparent from the following description of my invention.

The above objects are attained in accordance with my invention by heating a tetrahydropyryl ether to a temperature of at least 150° C. in the presence of 0.01% to 1% by weight of an inorganic acid.

I have discovered that when the tetrahydropyryl ether is heated to at least 150° C. in the presence of a small amount of inorganic acid which acts as a catalyst the compound undergoes pyrolysis which results in high yields of the desired hydroxyl compound and dihydropyran.

A small amount of inorganic acid is sufficient to catalyze the pyrolysis and concentrations of about 0.01% by weight may be utilized with satisfactory results. Preferably not more than about 1.0% of acid is utilized as increased concentrations of acid have in most cases no advantage and may cause undersired side reactions or decomposition.

The temperature of operation should be at least 150° C. and may be varied above that temperature depending upon the boiling point of the particular tetrahydropyryl ether undergoing pyrolysis. The temperature should not, of course, be so high as to cause undesired decomposition of the compounds involved. I prefer to carry out the reaction at a temperature within the range of 150° to 250° C. since the best results are generally obtained within this range.

In general when carrying out the catalytic pyrolysis of my invention it is desirable for best results to avoid the presence of substantial amounts of water during the reaction in order to obviate the formation of hydrolysis products. Thus, although the process may be efficiently operated in the presence of small amounts of water which may be present as an impurity in the reactants the addition of water should generally be avoided. While the system need not be anhydrous the amount of water present should be kept small, preferably not more than about 1% by weight for example. The reaction medium preferably consists essentially of tetrahydropyryl ether and acid catalyst.

Although any inorganic acid which is soluble in the particular tetrahydropyryl ether being subjected to pyrolysis may be utilized it is preferred to use hydrochloric, sulfuric or phosphoric acid as the catalyst. These acids are readily available and are generally most satisfactory. Other inorganic acids which are suitable include hydriodic, hydrobromic, nitric and sulfurous acids. If the acid is soluble to the extent of about 0.01% in the ether being treated the results are satisfactory. However, since it may be desirable in some instances to utilize higher concentrations of acid it is preferable that the acid be soluble to the extent of about 1.0% by weight in the ether.

The process of this invention is suitable generally for the production of hydroxyl compounds from tetrahydropyryl ethers. Thus, for example, where such ethers are available as by-products this invention provides a simple, direct and economical method for the recovery of dihydropyran and a hydroxyl compound. The process is, however, particularly valuable in the obtainment of substituted hydroxyl compounds where the hydroxyl group of the starting compound is protected by reaction with dihydropyran, the desired substituents are introduced and dihydropyran and hydroxyl compounds are then recovered by heating the tetrahydropyryl ether to a temperature of at least 150° C. in the presence of an inorganic acid catalyst.

For example, tetramethylene chlorohydrin which is readily obtained from the reaction between tetrahydrofuran and hydrogen chloride is an interesting and useful intermediate but the action of basic reagents upon tetramethylene chlorohydrin results in the formation of tetrahydrofuran and it is, therefore, impossible directly to substitute other groups for the chlorine atom. However, by first reacting the chlorohydrin with dihydropyran to form the tetrahydropyryl ether the chlorine atom may be substituted as desired. Several steps may be carried out prior to recovery of the desired hydroxyl compound. In accordance with my invention the tetrahydropyryl ether is then heated to a temperature of at least 150° C. in the presence of a small amount of inorganic acid, dihydropyran distills off and is recovered and the hydroxyl compound product which, in starting with tetramethylene chlorohydrin, may be methoxy butanol is obtained in purified form by redistillation of the residue. The recovered dihydropyran may then be recycled to react with a fresh batch of tetramethylene chlorohydrin or other hydroxyl compound.

The invention is especially suitable for tetrahydropyryl ethers of high boiling alcohols. The ether together with a small amount of acid is placed in a flask and heated.

When the pyrolysis temperature is reached the dihydropyran distills off leaving the alcohol behind. The process is also operable with tetrahydropyryl ethers of low boiling alcohols since upon pyrolysis both the dihydropyran and alcohol distill and may subsequently be separated by further distillation. The tetrahydropyryl ether should have a boiling point of 150° C. or higher if it is desired to operate at atmospheric pressure. However, if necessary, in a particular case the process may be operated at pressures sufficiently high to permit heating the liquid ether to at least 150° C.

The following examples illustrate my invention:

*Example 1*

Two moles, 217.0 g., of tetramethylene chlorohydrin was reacted with 2.36 moles, 190 g., of dihydropyran in the presence of a trace of HCl gas. The reaction mixture was maintained at 20–30° C. to avoid loss by vaporization. When the reaction was over, the mixture was allowed to stand for 15–20 minutes, washed with 5% NaOH solution, and then vacuum distilled. Chlorobutyl tetrahydropyryl ether, 348 g. (90%), was obtained, b. 105° C. at 10 mm.

Chlorobutyl tetrahydropyryl ether, 235 g.=1.25 moles, was refluxed for 4 hours with a solution of 80 g.=2 moles of sodium hydroxide in 800 cc. of methanol. The methanol was then distilled off and the crude product washed with water and distilled. 200 g. (87%) of pure methoxybutyl tetrahydropyryl ether was obtained, b. 94–96° at 10 mm. To this product, 2 g. (1%) of 85% phosphoric acid was added and the material heated slowly. At a temperature of 170° C., dihydropyran started to distill and, when the pot reached 220° C., the heat was cut and the residue put under vacuum to flash off any remaining volatile material. Redistillation of the combined distillates yielded 67 g. of dihydropyran (75%) and 94 g. of methoxy butanol, b. 100–102° at 50 mm. (85%).

*Example 2*

Chlorobutyl tetrahydropyryl ether, 140 g., 0.73 mole (prepared as in Example 1), 250 cc. of anhydrous tetrahydrofuran, and 24 g. (excess) magnesium were added to a flask and refluxed until no further heat evolution was observed. To the solution of Grignard, 25 g. (0.8 mole) of paraform was added portionwise. After all had been added, the solution was allowed to stir for 30 minutes. Next, water was added and the tetrahydrofuran layer separated off. Distillation of this fraction yielded 110 g. (80%) of ω-hydroxyamyl tetrahydropyryl ether, b. 150–170° at 15 mm. The crude ether was pyrolyzed by heating in the presence of 1% phosphoric acid. 43 g. (83%) of dihydropyran distilled off and vacuum distillation of the residue yielded 53 g. (90%) of 1,5-pentanediol, b. 140–142° at 18 mm.

*Example 3*

Hydroxyamyl tetrahydropyryl ether, 1350 g. (7.2 moles), and caustic soda, 350 g. (8.6 moles), were heated to 110° with stirring and methyl chloride passed in for 3 hours at 110°–130° C. After removal of the salt and water formed, the product was vacuum distilled. Methoxyamyl tetrahydropyryl ether, 780 g. (53%), was recovered boiling at 115–120° at 10 mm.

Methoxyamyl tetrahydropyryl ether, 510 g. (2.5 moles), was heated in the presence of 1% phosphoric acid. Over a period of one hour, the pot temperature rose from 177° to 194° C., and during this period, 175 g.=83% dihydropyran was liberated. Fractionation of the residue at reduced pressure yielded 287 g.=96% pure methoxy pentanol, b. 118° at 50 mm.

In contrast to the results obtained above the following example illustrates the effect of attempting to carry out pyrolysis of a tetrahydropyryl ether in the absence of an acidic catalyst.

*Example 4*

Methoxyamyl tetrahydropyryl ether was heated at 230° C. during 15 to 20 minutes in the absence of an acidic catalyst. No appreciable pyrolysis was observed.

The process of my invention is applicable generally to tetrahydropyryl ethers and has the advantage that not only are high yields of a desired hydroxyl compound obtained but dihydropyran is recovered in high yields and may be reutilized repeatedly in the preparation of the tetrahydropyryl ether.

The preparation of tetrahydropyryl ethers by reaction of dihydropyran with a hydroxyl compound is well known to the art and is illustrated, for example, in the article by Parham and Anderson to which reference is made in column 1 of this specification. As disclosed by Parham et al. it was previously known that dihydropyran could be reacted with compounds containing the hydroxyl group generally.

Typical of the tetrahydropyryl ethers which are suitable for use in my invention are the tetrahydropyryl ethers of aliphatic alcohols such as ethanol, butanol, tertiary amyl alcohol; polyhydroxy alcohols such as ethylene glycol, butylene glycol, glycerol, sorbitol; heterocyclic alcohols, for example, tetrahydrofurfuryl alcohol; the various aliphatic, aliphatic-aromatic and aliphatic-alicyclic alcohols, for example, methoxyethyl, triethylene glycol, phenoxyethyl, methoxy benzyl, cyclohexyloxyethyl, ethoxy cyclohexyl alcohols; amino alcohols such as the ethanol amines; ester alcohols; ester-ether alcohols; ketone alcohols; aldehyde alcohols; phenols, for example, phenol, catechol, hydroquinone, resorcinol.

I claim:

1. The process which comprises heating a tetrahydropyryl ether at a temperature of at least 150° C. in the presence of a catalytic amount of an inorganic acid and not more than 1% by weight of water and recovering dihydropyran and a hydroxyl compound.

2. The process which comprises heating a tetrahydropyryl ether at a temperature of 150° to 250° C. in the presence of 0.01% to 1.0% by weight of an inorganic acid and not more than 1% by weight of water and recovering dihydropyran and a hydroxyl compound.

3. The process of claim 2 wherein the inorganic acid is phosphoric acid.

4. The process of claim 2 wherein the inorganic acid is hydrochloric acid.

5. The process which comprises heating methoxybutyl tetrahydropyryl ether at a temperature of at least 150° C. in the presence of a catalytic amount of an inorganic acid and not more than 1% by weight of water and recovering dihydropyran and methoxy butanol.

6. The process of claim 5 wherein the temperature is 150° to 250° C. and the inorganic acid is present in the proportion of 0.01% to 1.0% by weight.

7. The process which comprises heating a tetrahydropyryl ether at a temperature of at least 150° C. in the presence of a catalytic amount of an inorganic acid and not more than 1% by weight of water and recovering dihydropyran and a substituted hydroxyl compound.

8. The process of claim 7 wherein the substituted hydroxyl compound is an alcohol.

9. The process which comprises reacting dihydropyran with a hydroxyl compound to form a tetrahydropyryl ether, introducing a desired substituent into said ether, heating said ether at a temperature of at least 150° C. in the presence of a catalytic amount of an inorganic acid and not more than 1% by weight of water and recovering dihydropyran and a substituted hydroxyl compound from the reaction mixture.

10. The process of claim 9 wherein the temperature is 150° to 250° C. and the inorganic acid is present in the proportion of 0.01% to 1.0% by weight.

HARRY B. COPELIN.

REFERENCES CITED

The following references are of record in the file of this patent:

Parkham, J. Am. Chem. Soc., 70, 4187 to 4189 (1948).

Certificate of Correction

Patent No. 2,541,747                                            February 13, 1951

HARRY B. COPELIN

It is hereby certified that error appears in the above numbered patent requiring correction as follows:

In the grant, line 6, and in the heading to the printed specification, line 3, for "HYDROLYSIS" read *PYROLYSIS*; column 2, line 9, for "undersired" read *undesired*; column 3, line 65, for "NoOH" read *NaOH*; column 6, line 32, list of references cited, for the name "Parkham" read *Parham*;

and that the said Letters Patent should be read as corrected above, so that the same may conform to the record of the case in the Patent Office.

Signed and sealed this 1st day of May, A. D. 1951.

[SEAL]

THOMAS F. MURPHY,
*Assistant Commissioner of Patents.*